United States Patent Office 3,635,889
Patented Jan. 18, 1972

---

3,635,889
ADHESION PROMOTING DENTAL MATERIALS
Rafael L. Bowen, Gaithersburg, Md., assignor to the United States of America as represented by the Secretary, Department of Health, Education, and Welfare
No Drawing. Filed Feb. 18, 1970, Ser. No. 12,423
Int. Cl. C08f *7/02;* A61k *5/00*
U.S. Cl. 260—47 U                              7 Claims

ABSTRACT OF THE DISCLOSURE

Polymerizable liquid condensation products that are also surface-active can be used for dental materials as primers or as monomers to mediate adhesive bonding between particulate fillers and between polymerizing formulations and surfaces such as tooth structure. Preferred the acid-catalyzed condensation products are (I) 2-methacryloxyethyl vanillate, (II) 2 - methacryloxyethyl-p-hydroxybenzoate, and (III) 2-methacryloxyethyl gallate. When surfaces of extracted teeth were wetted with the minimal amount of viscous liquid (I) and a hardening dimethacrylate composite material was applied, the average tensile bond strength was significantly raised (from 18 to 30 kg. f./cm.$^2$).

The mechanism appears to be that the electron-withdrawing effect of the carboxylate group in the aforementioned compounds and in other similar compounds encompassed in the scope of this invention deactivates the phenolic hydroxyl group toward degradative chain transfer with free radicals to the extent that the compounds homopolymerize and copolymerize rapidly when initiated with an amineperoxide system or with other free radical generating initiator systems. In contrast with eugenol, when product (I) containing 0.6% of N,N-dimethyl-sym-m-xylidine was mixed with zinc oxide powder containing 1.0% benzoyl peroxide, it hardened in about 4 minutes and had an average diametral tensile strength of 154 kg. f./cm.$^2$ and an average compressive strength of 1180 kg. f./cm.$^2$.

THE INVENTION

Since the products of this invention have the combined properties of being liquids of moderate viscosity, have the ability to rapidly polymerize, copolymerize or both, forming hard and strong organic polymers, and since they promote a significant increase in adhesion to metal oxide-containing surfaces even after prolonged immersion in water, they provide the ingredients for numerous applications, including the formation of adhesive composite materials, adhesive polymers, and as surface-active coupling agents they mediate bonding between hardening resins and suitable substrates that would otherwise lack adhesion after subjection to the effects of moisture. Specifically, the products of this invention have present utility as polymerizable adhesives, as cavity liners and varnishes and as an ingredient of a composite dental material containing particulate matter.

Presently available adhesion-promoting materials are solids that must be dissolved in inert volatile solvents (such as the surface-active comonomer described in U.S. Pat. 3,200,142 Bowen, which was the reaction product of N-phenyl glycine and a compound selected from glycidyl methacrylate and glycidyl acrylate). Additional prior art provisions are aqueous solutions of polyacrylic acid which harden by reaction with powdered zinc oxide admixed with minor quantities of other materials. This admixture of solution and powder comprising zinc oxide exhibits a degree of adhesiveness to hard tooth tissues and other metal-containing substrates (Smith, D. C. British Dental Journal, vol. 125, p. 381, November 1968). None of the other dental restorative materials have a significant degree of specific chemical adhesion to the hard tooth tissues which have not received special chemical treatments which are themselves responsible for the mediation of adhesive bonding.

Thus, the compounds of the present invention go beyond the materials previously available by having a combination of properties which include fluidity in the absence of solvents or diluents, ability to homopolymerize rapidly, ability to copolymerize with other monomers rapidly (e.g., with methacrylates of a filling), the ability to adhere to the surfaces of admixed particles, fibers, flakes, or other descrete solid materials constituting a discontinuous phase and by virtue of the adhesion-promoting characteristics converting what would otherwise be inert fillers of these types to be reinforcing fillers of this type, and to furthermore adhere either as a neat hardening resin or as a hardening composite resin to surfaces containing various metal oxides, including the calcium of the hard dental tissues of teeth.

Applications of these characteristics include the attachment of orthodontic appliances, fixed prosthetic appliances, temporary as well as relatively permanent restorative materials as restorations in prepared cavities of teeth, and the filling of developmental pits and fissures for the prevention of dental decay.

PRIOR ART

The following patents and literature references are cited generally to show the state of the prior art:

U.S. Pat. 3,200,142 R. L. Bowen; U.S. Pat. 3,066,112 R. L. Bowen; Pat. 3,539,526 Ser. No. 701,539, filed January 30, 1968, R. L. Bowen; Smith, D.C. British Dental Journal, vol. 125, page 381, November 1968; Brauer, G. M., McLaughlin, R., and Huget, E. F. Journal of Dental Research, vol. 47, page 622, July 1968; Peyton, F. A., et al. Restorative Dental Materials, 2d edition, C. V. Mosby Company, St. Louis, 1964, pages 183, 505, and 519; Skinner, E. W., and Phillips, R. W. The Science of Dental Materials. W. B. Saunders Co., Philadelphia, 1967, pages 476–486 and 510–515; Peyton, F. A., et al. Restorative Dental Materials, 3rd edition, C. V. Mosby Co., St. Louis, 1968, pages 183 and 444–450.

SCOPE OF INVENTION

Encompassed by the broad operable coverage of the present invention are also other examples such as the following: the condensation reaction product of 2-hydroxyethyl methacrylate with protochatachuic acid (3,4-dihydroxybenzoic acid), α-resorcylic acid (3,5-dihydroxybenzoic acid), β-resorcylic acid (2,4-dihydroxybenzoic acid, 2,4-dihydroxybenzenecarboxylic acid), gentisic acid (2,5-dihydroxybenzoic acid, 5-hydroxysalcylic acid), salicylic acid (2-hydroxybenzoic acid), and condensation reaction products of the foregoing acids with 2-hydroxy ethylacrylate, and addition reaction products of the foregoing acids wherein the carboxylic group reacts with the epoxy group of glycidyl methacrylate, glycidyl acrylate, or allyl glycidyl ether, and more generally, reaction products of the general formula:

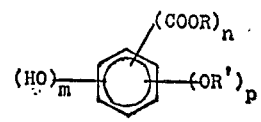

where:

$n = 1-5$,
$m = 1-5$, and
$p = 0-4$;

$$R = -CH_2-CH_2-O-\overset{O}{\underset{}{C}}-\overset{CH_3}{\underset{}{C}}=CH_2,$$

$$-CH_2-CH_2-O-\overset{O}{\underset{}{C}}-CH=CH_2,$$

$$-CH_2-CHOH-CH_2-O-\overset{O}{\underset{}{C}}-\overset{CH_3}{\underset{}{C}}=CH_2,$$

$$-CH_2-CHOH-CH_2-O-\overset{O}{\underset{}{C}}-CH=CH_2,$$

and $R' = -CH_3$ or $-C_2H_5$

The preferred products of the present invention are:

(I) 2-methacryloxyethyl vanillate
(II) 2-methacryloxyethyl p-hydroxybenzoate
(III) 2-methacryloxyethyl gallate and the most preferred is I above.

FREE RADICAL POLYMERIZATION

Polymerization reactions such as those of the present invention are catalyzed by initiators useful in the type of polymerization described in Encyclopedia of Polymer Science and Technology 7, 368 (1967) Wiley. Preferred combinations are the amine-peroxide combinations such as a benzoyl-peroxide system with an amine and preferred amines are N,N-dimethyl-p-toluidine and N,N-dimethyl-sym-m-xylidine.

COMPARISON WITH ZOE

It can be seen in a foregoing reference (Peyton, 1964, page 183) that eugenol reacts with zinc oxide to form a compound referred to as zinc eugenolate:

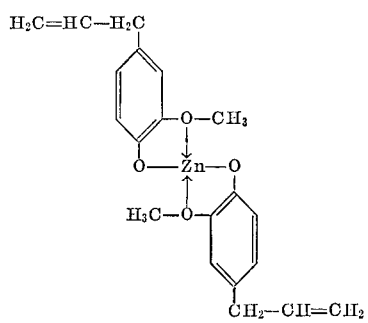

which is believed to crystallize and by combination of exhaustion of the liquid eugenol and possibly a cementitious characteristic of the zinc eugenolate forms a hard material containing unreacted zinc oxide particles. This hard material is referred to as zinc oxide-eugenol (ZOE) in the dental literature and has had widespread use as a base material to underlie other restorative materials, as temporary filling materials, as temporary cementing media, and for other purposes. However, it is not very strong nor durable; it disintegrates readily in the challenging environment of the oral cavity. One of its major advantages is that it is not acidic and is not irritating to the soft tissues of the mouth or to the dental pulp of the tooth. It appears to have no measurable adhesion to the hard tooth tissues or to other solid surfaces, at least after exposure to moisture.

The reaction between eugenol and zinc oxide is believed to form a chelated reaction product involving two eugenol molecules and one zinc atom (as is illustrated on page 183 of Peyton, F. A. et al. Restorative Dental Materials, 3rd edition, C. V. Mosby Co., St. Louis, 1968). The structural formula of eguenol is:

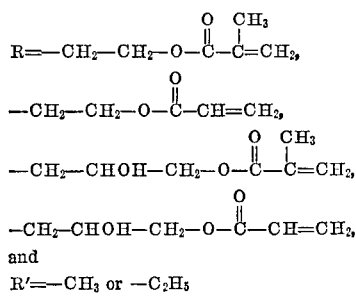

It is readily apparent that the structure of compound (I) of Table 1 also has the hydroxy and orthomethoxy groups (believed to be the moiety that forms the zinc oxide chelate) in the same configuration as does eugenol. Thus, under similar reaction conditions it would be expected that compound (I) of Table 1 would likewise react with the zinc oxide. However, in contradistinction to eugenol, the compound of Table 1 contains a reactive methacrylate group that can polymerize by a free radical mechanism, thus producing a high polymer having a continuous carbon to carbon backbone chain. This can account for the higher strength obtained from reaction products of compound (I) of Table 1 when compared with zinc oxide eugenol formulations and even with formulations of zinc oxide and eugenol containing EBA (ortho-ethoxy benzoic acid) and reinforcing fillers; strength properties for these materials are compared in Table 1A.

TABLE 1

Condensation-reaction products of 2-hydroxyethylmethacrylate with vanillic acid (I), with p-hydrobenzoic acid (II), and with gallic acid (III), respectively

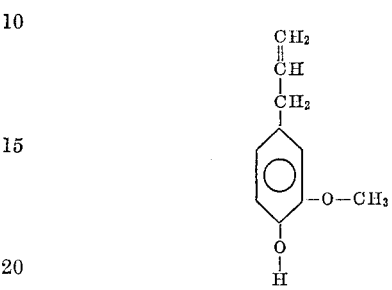

TABLE 1A

Strength of composition prepared with example compound (I) of the present invention compared with other materials, each containing zinc oxide as a major ingredient

| | ZnO (plus BP) Plus (I) (plus amine accelerator) | ZnO (plus additives) Plus EBA*-eugenol formulation | ZnO (plus additives) Plus Poly(acrylic acid) formulation. |
|---|---|---|---|
| Tensile strength: | | | |
| Kg. f./cm.² | 154 | 120 | 140. |
| P.s.i. | (2,200) | (1,700) | (2,000). |
| Compressive strength: | | | |
| Kg. f./cm.² | 1,180 | 950 | 1,200. |
| P.s.i. | (16,800) | (13,500) | (17,100). |
| | (Bowen, R. L., IADR Program and Abstracts 69, p. 75) | (Brauer, G.M. IADR Program and Abstracts 69, p. 104). | (Smith, Brit. D.J. 125. 381 Nov. 68.) |

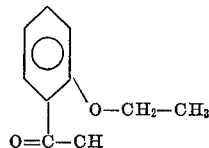

*EBA (o-ethoxybenzoic acid).

EXAMPLE 1

Method of preparation of 2-methacryloxyethyl vanillate (I)

Vannillic acid (4-hydroxy-3-methoxybenzoic acid) 98.66 gm., butylated hydroxy toluene 0.14 gm., di-t-butylsulfide 0.17 gm., and an excess (553 ml.) of 2-hydroxyethyl methacrylate were combined in a round-bottom flask equipped with a stirrer, steam bath, and a means of condensing, collecting, and measuring the water produced by the condensation reaction. To this stirred mixture was added, dropwise, 15 ml. of concentrated sulfuric acid. The stirred mixture was heated until the reaction appeared to be complete as evidenced by a plot of the collected condensate. To the slightly viscous brown liquid product was added an additional amount of antioxidant stabilizers (butylated hydroxy toluene 0.08 gm., and di-t-butylsulfide 0.26 gm.). The product was washed repeatedly with aqueous sodium chloride solution and water until the pH of the discarded water had reached that of the distilled water being used. The product was then washed with pentane. The product was thinned with 400 ml. of ether and 200 ml. of acetone and was washed four times with aqueous sodium chloride solution; solvents were evaporated off, and the product was washed further with water and pentane alternately. The product was then treated with activated carbon and stirred with "filter-aid," having been thinned with an acetone-methanol solution, after which it was filtered and the solvents were removed using vacuum and stirring. The product was further washed repeatedly with hexane; however, this and other attempts at purification using solvent extraction and partitioning failed to yield a product sufficiently pure so that the product would crystallize. Upon removal of the solvents with heat (about 60° C.) and vacuum with stirring, the resulting product was a clear brown, slightly viscous liquid with $n_D^{24.5}=1.5095$. The yield was 51 gm. or 31% of theoretical.

When this product had added a suitable amine free-radical accelerator such as about 0.599% of N,N-dimethyl-sym-m-xylidine, it was found that it could serve as a polymerizable binder for particulate reinforcing fillers containing a peroxide such as benzoyl peroxide, lauroyl peroxide or a combination of these. For example, when the product contained 0.599% of N,N-di-methyl-sym-m-xylidine and was mixed with zinc oxide powder containing 1% benzoyl peroxide, the mixture hardened at room temperature in 4 minutes. The specimens had average tensile strengths of 2200 p.s.i. and average compressive strengths of 16,800 p.s.i. This is considerably stronger than the materials prepared from the conventional zinc oxide-eugenol formulation (ZOE) commonly used in dental practice and compared favorably with some of the recent developments utilizing polyacrylic acid, zinc oxide combinations; eugenol, orthoethoxy benzoic acid and zinc oxide combinations (Table 1A) and zinc phosphate cements that are commonly used in dentistry for the cementation of cast gold restorations, as bases under metallic fillings and for other purposes.

Furthermore, this product served as a coupling agent that improved the adhesive bonding between composite restorative mtaerials and the prepared surfaces of the human tooth. This is evidenced by the data given in Table 2. Additionally, this reaction product would be expected to improve adhesion between metal oxide- containing surfaces and polyester and other resins used in sealing pits and fissures, as protective coatings and as unreinforced direct fillings resins.

TABLE 2
Tensile adhesive bond strengths
(10% solutions in acetone)

| Eugenol | (I) | (II) | (III) |
|---|---|---|---|
| 50 p.s.i. | 180 p.s.i.* | 200 p.s.i. | 260 p.s.i.* |

Structures (left to right):

Eugenol: $CH_2=CH-CH_2-$ phenyl ring with $-O-CH_3$ and $-O-H$ (I): $CH_2=C(CH_3)-C(=O)-O-CH_2-CH_2-O-C(=O)-$ phenyl ring with $-O-CH_3$ and $-O-H$ (II): $CH_2=C(CH_3)-C(=O)-O-CH_2-CH_2-O-C(=O)-$ phenyl ring with $-O-H$ (III): $CH_2=C(CH_3)-C(=O)-O-CH_2-CH_2-O-C(=O)-$ phenyl ring with $HO-$ and $-OH$ NOTE.—In adhesion-promoting characteristics, the control (acetone only) gave 90 pound per square inch. The values are an average of six dentin surfaces after immersion in wate for 24±4 hours at room temperature.

The asterisks indicate significant difference from the control by virtue of the fact that each of the six assemblies ranked higher than tne corresponding assembly of the control, which would happen less than two times in 100 if there was no real difference.

Adhesion tests that were conducted to evaluate the efficacy of the compounds of the present invention were conducted utilizing a simple tensile butt joint method, similar to those commonly used by persons skilled in the art. Extracted human molars were ground down to remove the enamel. They were embedded in dental stone in a cylinder and were flattened off with a special device that assures planarity and proper alignment of the plane with the long axis of the tensile adhesion measuring equipment. A diaphragm determined the area of the bond. A composite material such as the one described in Pat. 3,066,112 Bowen consisting of fused silica with vinyl silane, or that of application Ser. No. 701,539 Bowen, filed Jan. 30, 1968, now pending, was mixed and placed on the flat end of a small plunger and then pressed down with a constant weight against the treated or untreated dentin surface, inside of the cylinder that maintained alignment of the parts; and, after 15 minutes from the start of the mix, the entire assembly was immersed in water for 20 to 24 hours. Then the force required to break this bond was measured. The same teeth were then resurfaced and then measured with another of the coupling agents or with the control (such as the acetone only). The results are shown in Table 2. The asterisk indicates that the difference was obviously significant by virtue of the fact that each of the six experimentals ranked higher than the corresponding control, which would happen less than two times in one hundred if there was no real difference according to standard probability statistics.

Since the product gives a degree of adhesive bonding to tooth tissue and since it is capable of homopolymerization when activated by a teritary aromatic amine accelerator and mixed with reinforcing fillers such as silane-treated siliceous particles containing a peroxide, or metal oxides such as zinc oxide, the properties indicate the basis for a commercial composite restorative material that is inherently adhesive to solid surfaces containing metal ions such as does the surface of the hard tooth tissues, certain minerals, oxide surfaces of metals, certain ceramics and certain glasses containing metal ions.

In contrast to the presently available material comprising poly(acrylic acid) solution (Table 1A), the compounds of the present invention do not give strong acid reactions because of the nature of the phenolic hydroxy groups. The poly(acrylic acid) gives a strongly acid reaction when it is dissolved in water.

It should be understood that the data on adhesion promotion between a polymerizing resin and a solid surface containing metal oxides, as for example the calcium of hard dental tissues of teeth, and the data on the strength of composite materials comprising polymerizable resins and discontinuous solid particles whose surfaces contain metal oxides, such as for example zinc of the zinc oxide particles, are related, as is recognized by those skilled in the art, since the degree of water-resistant adhesive bonding between two phases of materials is in both cases involved, and the strength of composite materials is directly related to the degree of adhesive bonding between the continuous polymeric phase and the discontinuous phase comprising the reinforcing filler or fillers. In fact, "inert fillers" and "reinforcing fillers" are distinguished from one another by the degree of adhesive bonding between the interfaces of the filters and the continuous binding phase of such composites. In the compounds of this invention, the polar moieties can compete with water and improve the adhesive bonding to the solid surfaces containing metal oxides (or metals and alloys that have somewhat oxidized surfaces), while, independently, the polymerizable groups can homopolymerize or copolymerize with other suitable monomers to form continuous polymeric network phases, and thus by definition become adhesive polymers or adhesive composites.

EXAMPLE 2

Synthesis of 2-methacryloxyethyl-p-hydroxybenzoate (II)

This compound was prepared in the following manner: Para-hydroxybenzoic acid (172 gm.; 1.25 mols) was combined with 2-hydroxyethyl methacrylate (324 gm.; 2.5 mols), 0.53 gm. of di-t-butylsulfide and 0.07 gm. of butylated hydroxy toluene. These were placed in a reaction vessel equipped with a stirrer, a steam bath for heat, and a condensing and collecting apparatus to measure the water evolved from the condensation reaction. To this mixture 5 ml. of 96% concentrated sulfuric acid (density approximately equal to 1.84 gm./ml.) was added. The condensation reaction was conducted with heat and stirring until the appropriate amount of water had been collected in the condenser system. The product was transferred to a separatory funnel and was washed with a less-than-saturated solution of sodium bicarbonate ($NaHCO_3$ equivalent to total p-hydroxybenzoic acid plus the sulfuric acid). It was then washed with aqueous sodium chloride solution. The product was then mixed with benzene and was filtered to remove residual crystalline p-hydroxy benzoic acid. The benzene was stripped out with a vacuum and heating on a steam bath. The product was washed three times using a total of 500 ml. of pentane. The pentane was removed by evaporation and the product was thinned with toluene and mixed with activated carbon and a filtering aid and filtered to remove residual crystals of p-hydroxy-benzoic acid. The solvents were removed by the use of a vacuum, moderate heating and stirring, yielding a clear, yellow, slightly viscous liquid having a refractive index of $n_D^{24}=1.507$. The yield of 115 gm. was approximately 40% of the theoretical yield. When an amine accelerator such as N,N-di-methyl-sym-m-xylidine or N,N-di-methyl-toluidine was added to this liquid product and its mixture subsequently combined with particulate fillers containing benzoyl peroxide, lauroyl peroxide, or both, the mixture hardened at room temperature within 0.5 to 60 minutes, depending upon the concentrations of the amine accelerator, the benzoyl peroxide and the nature and surface treatment of the particulate filler. For example, when the product contained 0.58% of N,N-dimethyl-sym-m-xylidine and was then mixed with zinc oxide powder containing 1% benzoyl peroxide, the mixture hardened in approximately 1 minute at room temperature. However, when to the product additional stabilizers (inhibitors) were added so as to give a total of 0.58% N,N-dimethyl-sym-m-xylidine, 0.23% butylated hydroxy toluene and 0.19% di-t-butylsulfide, this formulation, when mixed with zinc oxide powder containing 1% benzoyl peroxide had a hardening time of about 6 minutes.

When used as a coupling agent between dentin and a composite restorative material, the adhesive bond strength was approximately twice that of a control as shown in Table 2.

The structure of the instant compound may be compared closely with that of methyl-p-hydroxybenzoate used as a preservative for galenicals, etc., and butyl-p-hydroxybenzoate, which is used as a preservative for cosmetic emulsions. It is theorized for provisional utility that the present compound 2-methacryloxyethyl-p-hydroxybenzoate may have commercial possibilities as an antiseptic, bacteriostat, and germicide.

EXAMPLE 3

Method of preparation of 2-methacryloxyethyl gallate (III)

Gallic acid monohydrate (110 gm.; 0.585 mol, 2-hydroxyethyl methacrylate (296 ml.), and p-toluene sulfonic acid monohydrate (practical grade, 96%; 9.9 gm.) were stirred together and heated gradually to a maximum temperature of 150° C. until the theoretical amount of water of condensation was removed by distillation. The toluene-soluble portion of the product was washed repeatedly with water and with pentane. The filtered product was stripped of solvents using a vacuum and slight warming.

The resulting product was a viscous (but pourable), clear amber liquid with refractive index of $n_D^{24}=1.517$. Various methods were attempted to crystallize the product without success. As is indicated in Table 2, a 10% acetone solution of this product significantly increased bonding between a composite resin material and surfaces of dentin, compared to controls in which the acetone solvent only was applied to the dentin.

The embodiments of the invention in which an exclusive property or privilege is claimed are defined as follows:

1. A composite dental filling material comprising a metal oxide particulate material and a polymeric adhesive material prepared by the polymerization of a condensation product selected from 2-methacryloxyethyl vanillate, 2-methacryloxyethyl-p-hydroxybenzoate, and 2-methacryloxyethyl gallate in the presence of an amine-peroxide free-radical polymerization initiator.

2. The filling material of claim 1 wherein the reaction product utilized is 2-methacryloxyethyl vanillate.

3. The filling material of claim 1 wherein the polymerization initiator is a tertiary amine-peroxide.

4. The method of treating human teeth for restorative dentistry which consisting of applying as a cavity primer a solution of a condensation product selected from 2-methacryloxyethyl vanillate, 2 - methacryloxyethyl-p-hydroxybenzoate, and 2-methacryloxyethyl gallate.

5. The method of claim 4 wherein the reaction product is 2-methacryloxyethyl vanillate.

6. The method of treating human teeth for restorative dentistry which comprises applying as a cavity liner a solution of a reaction product selected from 2-methacryloxyethyl vanillate, 2-methacryloxyethyl-p-hydroxybenzoate, and 2-methacryloxyethyl gallate, zinc oxide and an amine peroxide free radical polymerization initiator.

7. The method of claim 6 wherein the reaction product is 2-methacryloxyethyl vanillate and the free radical polymerization initiator comprises N,N-dimethyl-sym-m-xylidine and benzoyl peroxide.

References Cited

UNITED STATES PATENTS

| 3,066,112 | 11/1962 | Bowen | 260—41 |
| 3,503,128 | 3/1970 | Boyd | 32—15 |
| 3,541,068 | 11/1970 | Taylor | 260—41 |

OTHER REFERENCES

Bowen, R. L., IA for Dental Research, 69, p. 75.

JOSEPH L. SCHOFER, Primary Examiner

C. A. HENDERSON, JR., Assistant Examiner

U.S. Cl. X.R.

32—15; 106—35; 260—473 S, DIG 36